United States Patent [19]

Kamimura

[11] Patent Number: 5,182,723

[45] Date of Patent: Jan. 26, 1993

[54] COMPUTING METHOD OF FLOATING-POINT REPRESENTED DATA

[75] Inventor: Masatsugu Kamimura, Kobe, Japan

[73] Assignee: Fujitsu Ten Limited, Japan

[21] Appl. No.: 767,896

[22] Filed: Sep. 30, 1991

[30] Foreign Application Priority Data

Oct. 2, 1990 [JP] Japan .................................. 2-263009

[51] Int. Cl.$^5$ .............................................. G06F 7/38
[52] U.S. Cl. ................................................. 364/748
[58] Field of Search ................... 364/748, 745, 715.01, 364/724.01, 724.16, 724.17, 754, 736, 768

[56] References Cited

U.S. PATENT DOCUMENTS 4,809,205  2/1989  Freeman .............................. 364/721

Primary Examiner—Tan V. Mai
Attorney, Agent, or Firm—Staas & Halsey

[57] ABSTRACT

A computing method of floating-point represented data including dividing data x with a n (n>M) bit length into high rank data X' and low rank data α with a mutual m bit length, a mantissa part of the high rank data X' leaving the same bits as those of the data x by k bits (k≧1) from its initial bit to replace the rest of the bits of X' by zero, the low rank data α being formed as X—X', and computing other data together with the high rank data X' and the low rank data α.

4 Claims, 9 Drawing Sheets

COMPUTING METHOD OF FLOATING-POINT REPRESENTED DATA

BACKGROUND OF THE INVENTION

1. Field of the Invention

The present invention relates to a computing method of floating-point represented data for improving low frequency characteristics of an audio system. Generally the computing method of floating-point represented data having an exponential part and a mantissa part is requested to enhance the computing accuracy. More particularly, the present invention is intended to achieve higher computing accuracy in the case that a computing bit length of the floating-point represented data is constant in a digital signal processor.

2. Description of the Related Art

FIG. 1A is a view showing a prior art computing method of a digital filter. As shown in FIG. 1A, a conventional digital filter formed by DSP(Digital Signal Processor) includes multipliers 51, 52, 53, 54, and 55 factors of which are $a_0$, $a_1$, $a_2$, $b_1$ and $b_2$ respectively, delay memories 56, 57, 58, and 59 for delaying a signal by a sampling time and an adder 60. The delay memory 56 receiving an input signal $S_i$, is connected to the delay memory 57 in series and the delay memory 58 receiving an output signal $S_o$ is connected to the delay memory 59 in series. The multiplier 51 also receives the input signal $S_i$, and the multipliers 52, 53, 54 and 55 are connected to outputs of the delay memories 56, 57, 58, and 59. The adder 60 is connected to outputs of the multipliers 51, 52, 53, 54 and 55 respectively to send the output signal $S_o$.

FIG. 1B is a view showing architecture of DSP for realizing the computing method of FIG. 1A. As shown in the Figure, DSP includes registers 71 and 72 with a mutual m bit length, a multiplier 73 that multiplies data stored in the register 71 by data stored in the register 72 to output a computing result with n(n>m) bit length, a register 74 for storing the computing result with n bit length output from the multiplier 73, an adder 75 that adds data stored in the register 74 to data that had been added therein before one sampling time, a register 76 that stores data with n bit length outputted from the adder 75, an internal bus 77 that is connected to the registers 71, 72, 74 and 76. The factors $a_0$, $a_1$, $a_2$, $b_1$ and $b_2$ of the multipliers 51, 52, 53, 54 and 55 are input to either register 71 or 72, and, the input signal $S_i$ is input to the other register 72 or 71.

FIGS. 2A and 2B are views showing data used in the computation of FIG. 1B. The data with m bit length of FIG. 1B are shown in the FIG. 2A and the data with an (n>m) bit length are shown in the FIG. 2B. These data are floating-point represented data having a sign, an exponential part and a mantissa part. In the architecture of DSP of FIG. 1B, the data of the registers 71 and 72 have a mutual m bit length respectively as shown in the FIG. 2A, while the computing result has the n bit length longer than that of register 71 etc. to secure the computing accuracy as shown in FIG. 2A. After this, m and n are replaced by definite numerical values since generality is not lost. So for example, m=25, n=31 are set as necessary.

FIG. 3 is a view showing a prior art low frequency gain characteristic of a digital filter. As shown in FIG. 3, in a low frequency range of the digital filter constituted in, FIG. 1A, said factors $a_0$, $a_1$, $a_2$, $b_1$ and $b_2$ are determined to obtain, for example, a center frequency 50 Hz, a peak gain 12 dB and Q value 4 based on the computation of the architecture of DSP of FIG. 1B.

In the above computing method of floating-point represented data of the prior art, however, since a change in signal level is so small in the low frequency range to process signals in DSP of the audio system and does not especially appear sophisticated between the sampling times, a problem arises in that the computing process in the low frequency range can not be performed with high accuracy due to a shortage of a computing bit length in the digital signal processing. Further the reason for this problem will be described in detail below.

FIG. 4 is a view showing prior art total harmonic distortion in a low frequency range. As shown in the FIG. 4, about 0.3% distortion is caused on average in a total frequency range. Because the computing bit length is determined so that the sufficient great change in signal level is to be obtained in the high frequency range, but the computing bit length is not so great, as the change in signal level is detected in the low frequency range, since it is very small for the sampling period. For example definitely, in FIG. 1B, as the computing factors $a_0$, $a_1$, $a_2$, $b_1$ and $b_2$ of the digital filter shown in FIG. 1A are stored in either the registers 71 or 72 having the mutual m bit length, the computing bit length of the computing factors is limited to the m bit length as shown in FIG. 2B. Further since the computing result with the n bit length is output once to the internal bus 77 with the m bit length in feedback computation, it is shortened to the m bit length. Therefore in order to enhance the computing accuracy of the floating-point represented data in a DSPLSI for general purpose, the computing bit length of the computing factors of the registers and the the data bit length must be made different individually but the bit length of the internal bus and also an accumulator for storing the computing result must be made great. This causes a large scale of hardware. Further even if the bit length of the accumulator can be made great, the data transmitted from the accumulator to other registers and memories are rounded off or approximated and are not sufficient to be processed in a low frequency range.

SUMMARY OF THE INVENTION

An object of the invention is to solve the above problem by providing a computing method of floating-point represented data so as to facilitate processing a signal with higher computing accuracy in low frequency range.

FIG. 5 is a view showing a principle constituting the present invention. With this object in view, the essence of the invention resides in a computing method of floating-point represented data comprising the step of dividing data x with an (n>m) bit length into high rank data X' and low rank data $\alpha$ with a mutual m bit length, a mantissa part of the high rank data X' leaving the same bits as those of the data x by k bit length (k≧1) from its initial bit to replace the rest or remaining bits of X' by zero, the low rank data $\alpha$ being forming as X-X', and computing other data together with the high rank data X' and the low rank data $\alpha$.

With the above computing method of floating-point represented data, for example in the case of multiplying the data X i.e. a given factor by a digital signal in computation of a digital filter, it is possible to make an effective figure of the factor longer by storing the high rank data X' and the low rank data α of the data X in registers with the mutual m bit length. Thus the computing accuracy is enhanced. Further the data with the n bit length obtained as a computed result are divided into the high rank data X' and the low rank data α with the mutual m bit length that are stored in the registers individually, so that they maintain their accuracy, as they are until computation is performed with next other data. Therefore these data are not made round or rounded off even if they are transmitted and stored in other registers and memories. Thus the computing accuracy is enhanced.

DESCRIPTION OF THE PREFERRED EMBODIMENTS

Generally in a floating-point representation, a numerical value may be expressed as $a \cdot p^b$. A digital computing method of DSP according to the present invention divides the numerical value into two values or parts with mutual or the same data length to perform the computation of one part of the divided data and the other part of the divided data individually.

First a data dividing method is described. Before this, the floating-point representation by the binary notation is described. The numerical value may be expressed as (numerical value)=(sign)×(1.0+(mantissa part))× $2^{(exponential\ part)-31}$. For example the numerical value +1.0 which consists of 25 bit length data including the sign of one bit length, the exponential part (b) of 6 bit length and the mantissa part (a) of 18 bit length may be expressed as $X = 0 \quad 011111 \quad 000000000000000000 B,$ sign  exponential part(b)    mantissa part(a)

where the base p=2, the sign 0 means +, the exponential part(b) 011111B is expressed as $2^{b-31}=2^0=1$ (b=31D) and the mantissa (a) means 0.0. Additionally expressing it by the hexadecimal notation, it becomes X=07C0000H.

Next in the same way, a numerical value 1.1 may be expressed as $X = 00111110001100110011001100110B,$ (1)

in the decimal notation as $X = 1.0999984741210937 5 D,$ and errors are caused from the sixth decimal place. Expressing it by the hexadecimal notation, it becomes X=07C6666H.

Next the above numerical value 1.1 is divided into next two parts as high rank data X' and low rank data α i.e., $X' = 00111110001100110000000000 B,$ (2)
$= 1.099609375 D$
$= 07C6600 H,$ and $\alpha = 00100111001100110011001100110B,$ (3)
$= 0.000390624651885032653808593 7 5D$
$= 04E6666 H.$ That is to say, in said X of the equation 1 the high rank data X' leave as they are or are the same as the X bits from the most significant bit to 17th bit to replace the rest bits of X' by zero. Using j for numbers of the above 17 bits and k for numbers of the bits of the mantissa part, k is expressed as k=j−(6+1)=17−7=10 and satisfies k≧1. Further it is requested to note that if k is too great, the low rank data α becomes too small to be represented by the floating point. Thus as compared with said X and the numerical value which consists of the divided high rank data X' and the divided low rank data α, the error of said X is 0.00000152587890625, while the error of the numerical value consisting of the high rank X' data and the low rank data α is 0.0000000003481149 so that the accuracy of the computing method is improved by 4 figures, or decimals based on the decimal notation. Additionally it is improved by 8 figures based on the binary notation.

Figure 1A:
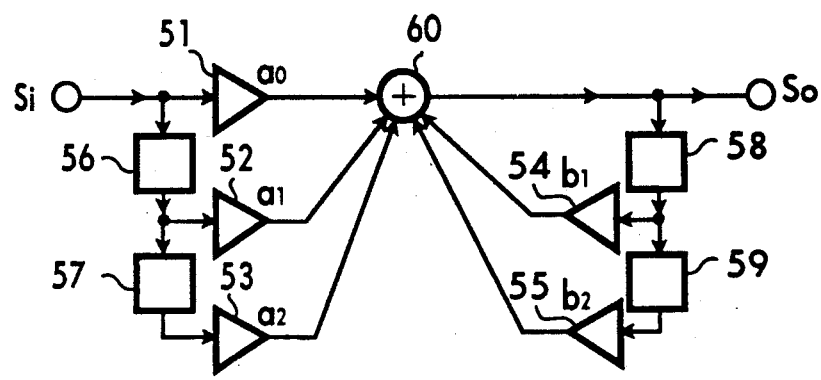
FIG. 1A is a view showing a prior art computing method of a digital filter.
Figure 1B:
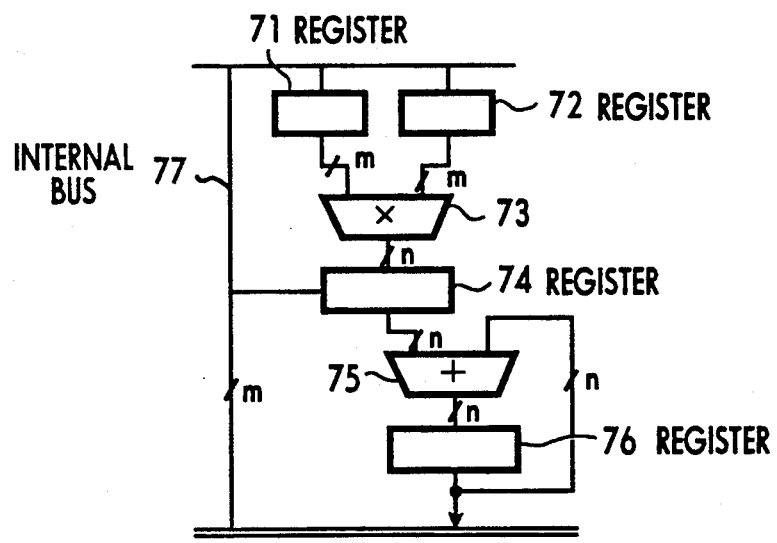
FIG. 1B is a view showing architecture of DSP for realizing the computing method of FIG. 1A.
Figure 2A:
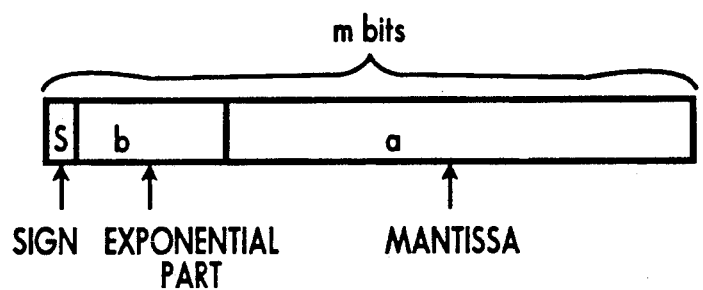
FIGS. 2A and 2B are views showing data used in the computation of FIG. 1B.
Figure 2B:
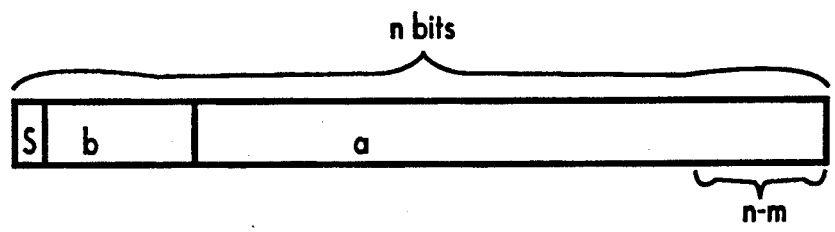
Figure 3:
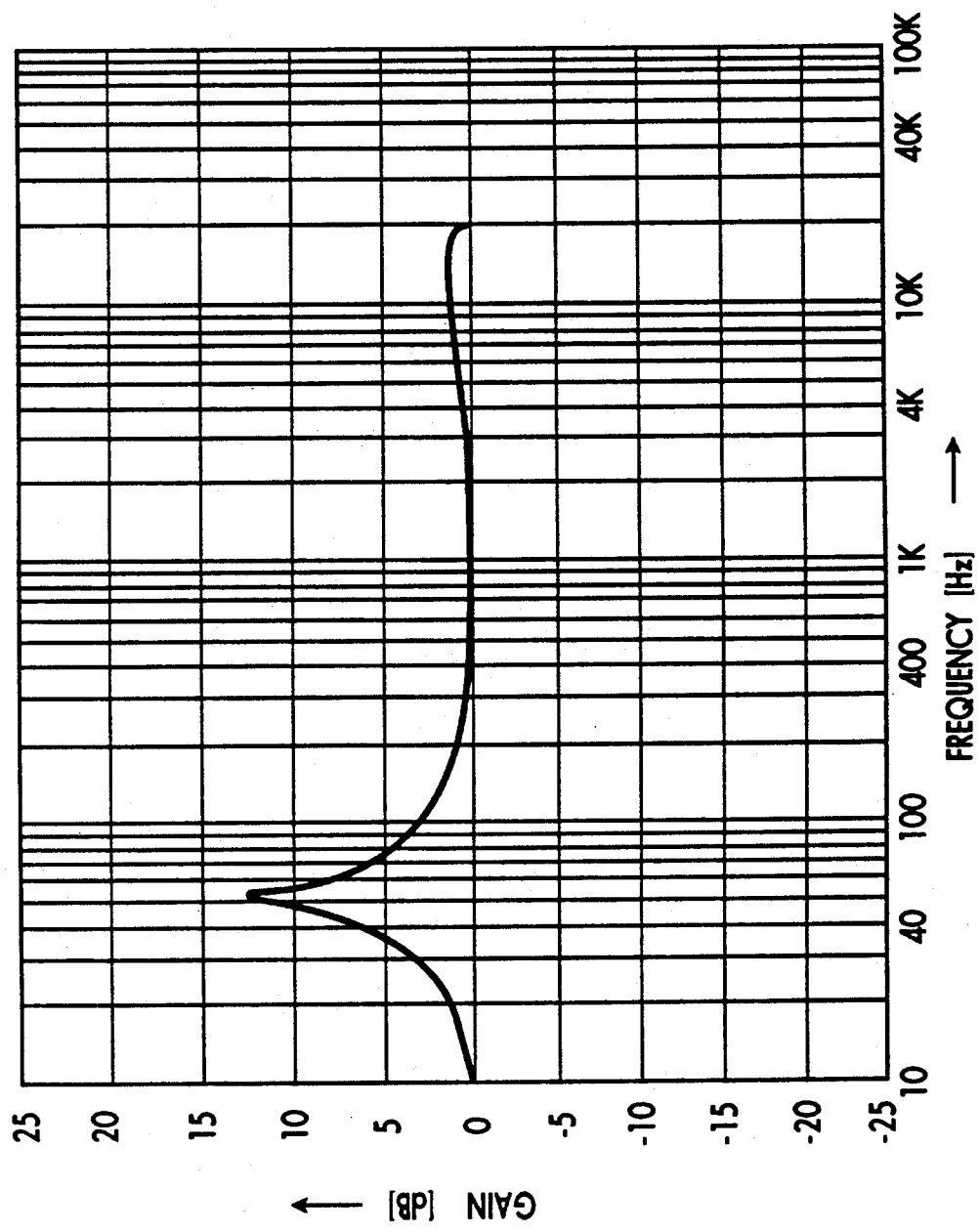
FIG. 3 is a view showing a prior art low frequency gain characteristic of a digital filter.
Figure 6:
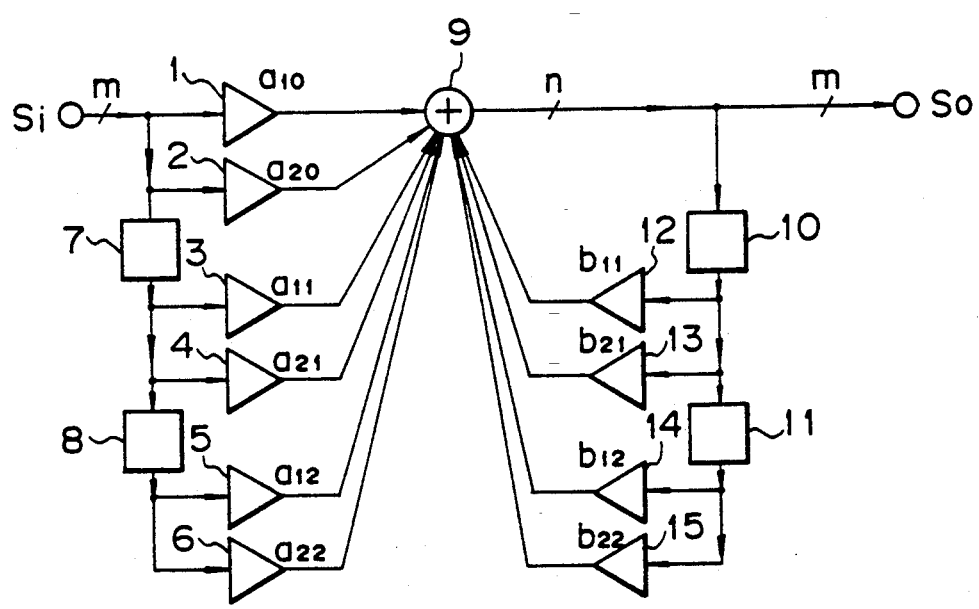
FIG. 6 is a view showing a computing method of floating-point represented data according to a first embodiment of the present invention.

FIG. 6 is a view showing a computing method of floating-point represented data according to a first embodiment of the present invention. In the digital filter shown in FIG. 6, said factor $a_0$ of the multiplier 51 of FIG. 1A is divided into factors $a_{10}$ and $a_{20}$ with the mutual m bit length according to the above dividing method such that $a_0=a_{10}+a_{20}$, $a_{10}<a_{20}$ to set the factors $a_{10}$ and $a_{20}$ in multipliers 1 and 2 respectively. In the same way as the above mention, factors $a_{11}$, $a_{21}$, $a_{12}$, $a_{22}$, $b_{11}$, $b_{21}$, $b_{12}$ and $b_{22}$ are set in multipliers 3, 4, 5, 6, 12, 13, 14, and 15 respectively. Therefore a digital input, and delay signals of delay memories 7 and 8, which have the mutual m bit length, delay signals of the delay memories 11 and 12 for feedback that have the mutual m bit length are multiplied by the computing factors with long significant figures by means of said multipliers and added by an adder 9. Consequently the computing accuracy of the n bit length data is enhanced, so it is possible to extract and process a very small signal level without ignoring it as usual in the low frequency range of a sound signal.

Figure 7:
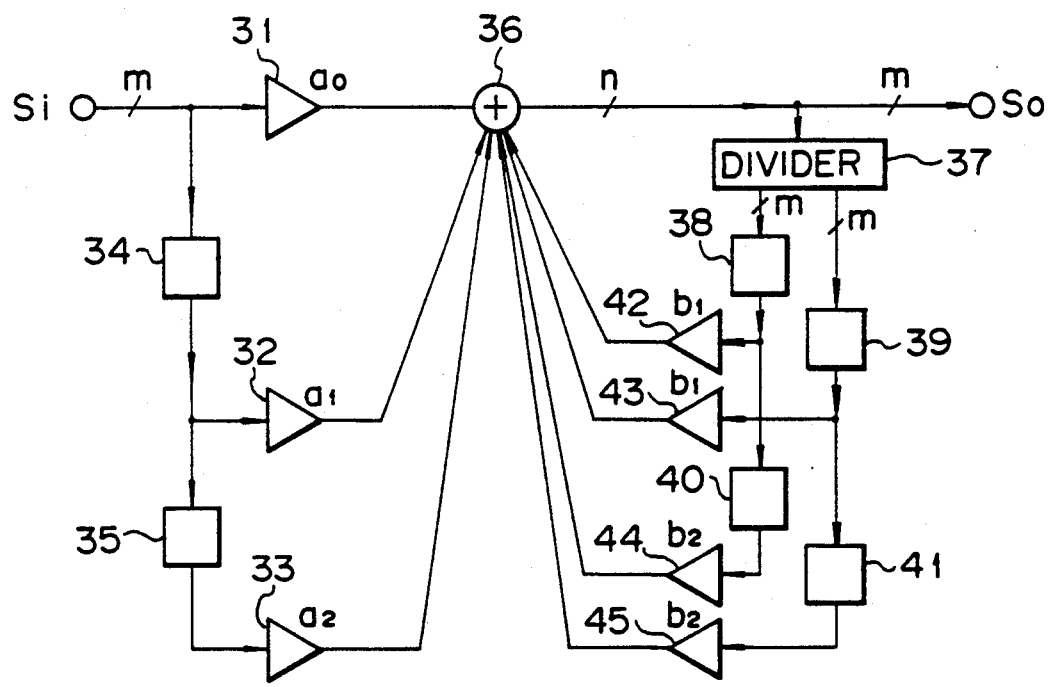
FIG. 7 is a view showing a computing method of floating-point represented data according to a second embodiment of the present invention.

FIG. 7 is a view showing a computing method of floating-point represented data according to a second embodiment of the present invention. In FIG. 7 a digital input and delay signals of delay memories 34 and 35 that have m bit lengths are multiplied by factors $a_0$, $a_1$, and $a_2$ by means of multipliers 31, 32, and 33 respectively to be added by an adder 36. A feedback signal of the adder 36 with the m bit length is divided into factors $r_1$, $r_{1n}$ and $r_{2n}$ with the m bit length by means of a divider 37 according to the above dividing method such that $r_n r_{1n} + r_{2n}$, $r_{1n} < r_{2n}$. The divided feedback signals are delayed by delay memories 38, 39, 40 and 41 respectively. Each of the divided delay signals is multiplied by means of multipliers 42, 43 and 44, 45 in which the same factors $b_1$ and $b_2$ are set respectively. Adding to the first embodiment it is possible that the signal multiplied in such a way enhances the computing accuracy of data so as to process a very small signal in a low frequency range. Further in FIG. 7, it is possible to enhance the computing accuracy higher or more if the factors of the multipliers 31, 32, 33, 42, 43, 44 and 45 are divided in the same way as the embodiment shown in FIG. 6.

Figure 8:
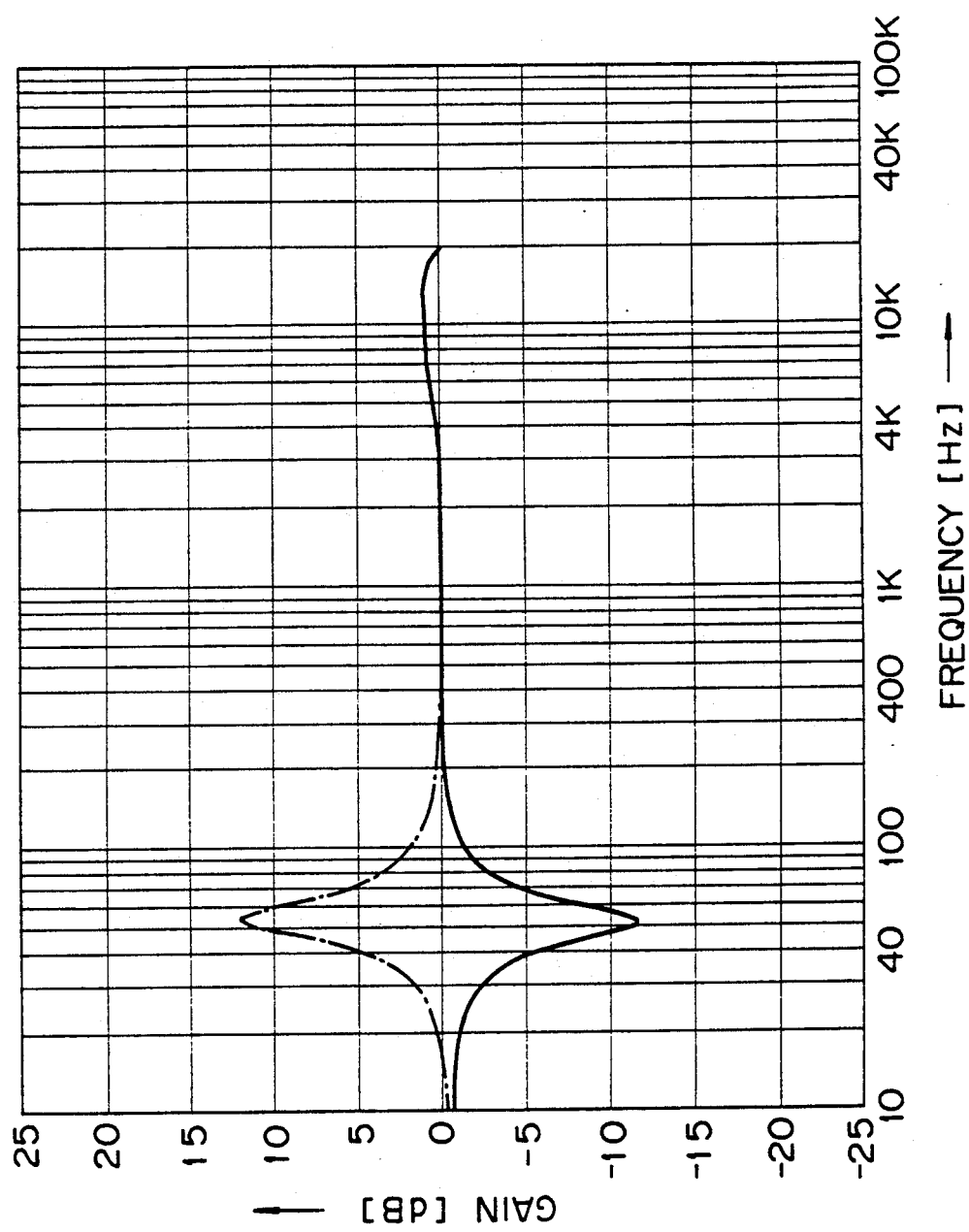
FIG. 8 is a view showing a low frequency gain characteristic of a digital filter according to the embodiments.

FIG. 8 is a view showing a low frequency gain characteristic of a digital filter according to the embodiments. As shown in FIG. 8, a digital filter according to the embodiment is set to the conditions of a center frequency 51 Hz, a peak gain ±12 dB and Q value 4.

Figure 4:
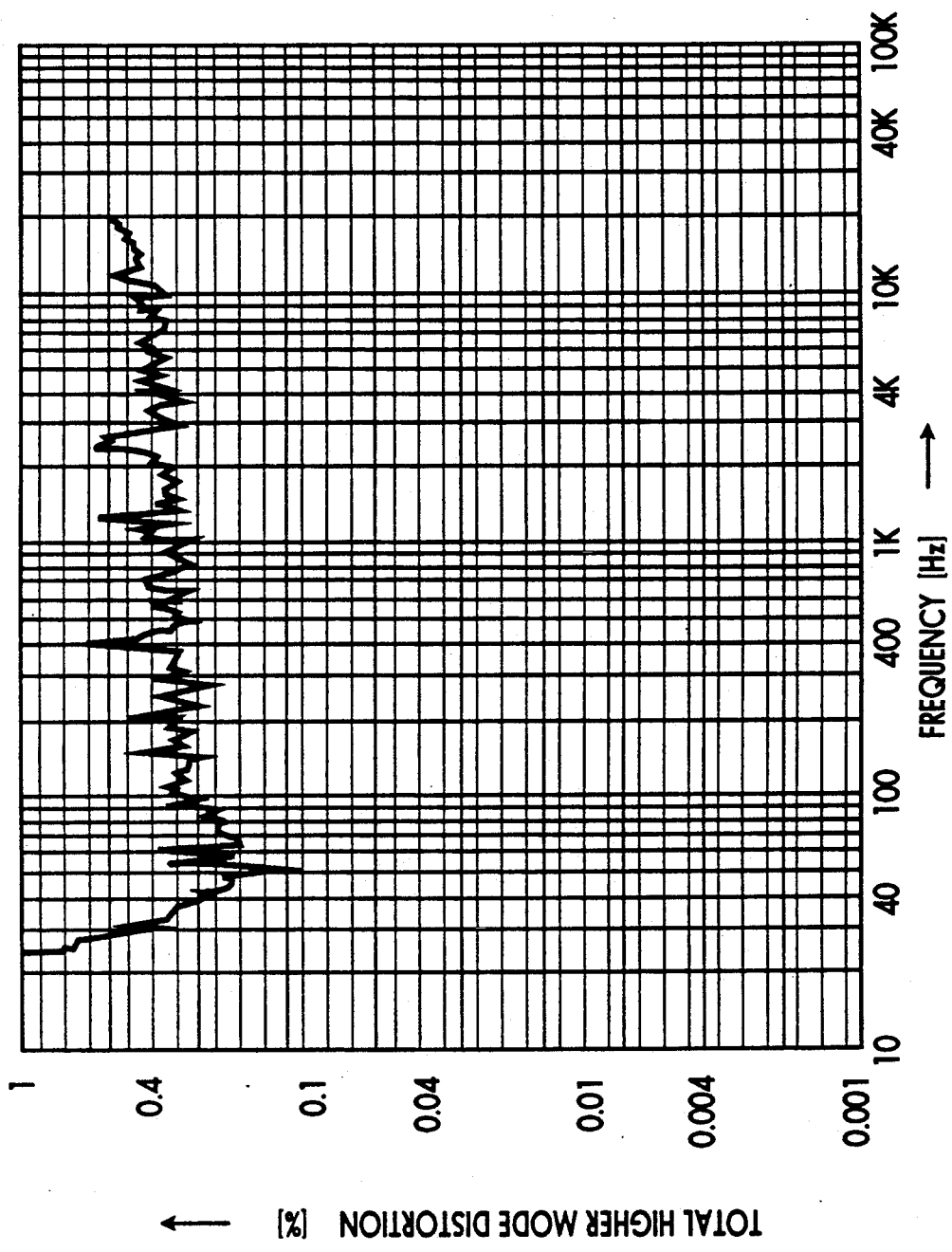
FIG. 4 is a view showing prior art total harmonic distortion in a low frequency range.
Figure 5:
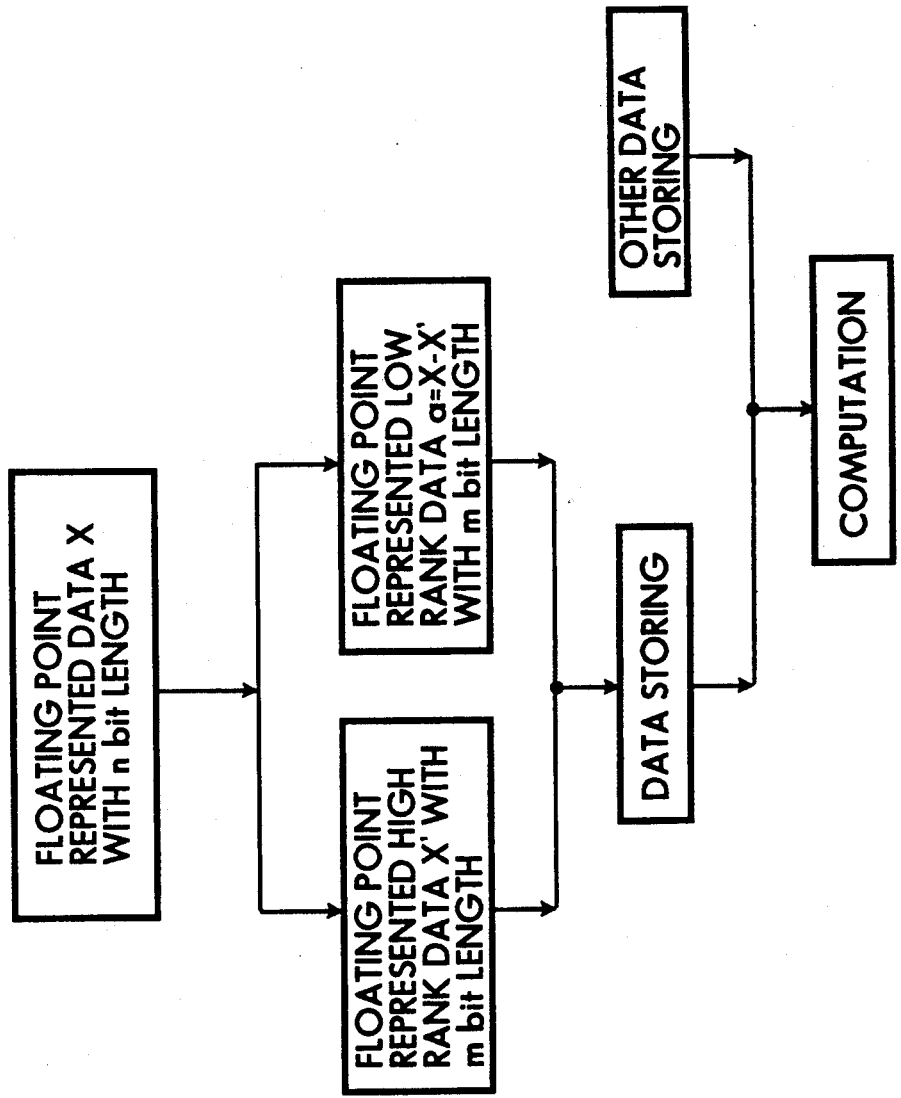
FIG. 5 is a view showing a principle constituting the present invention.
Figure 9:
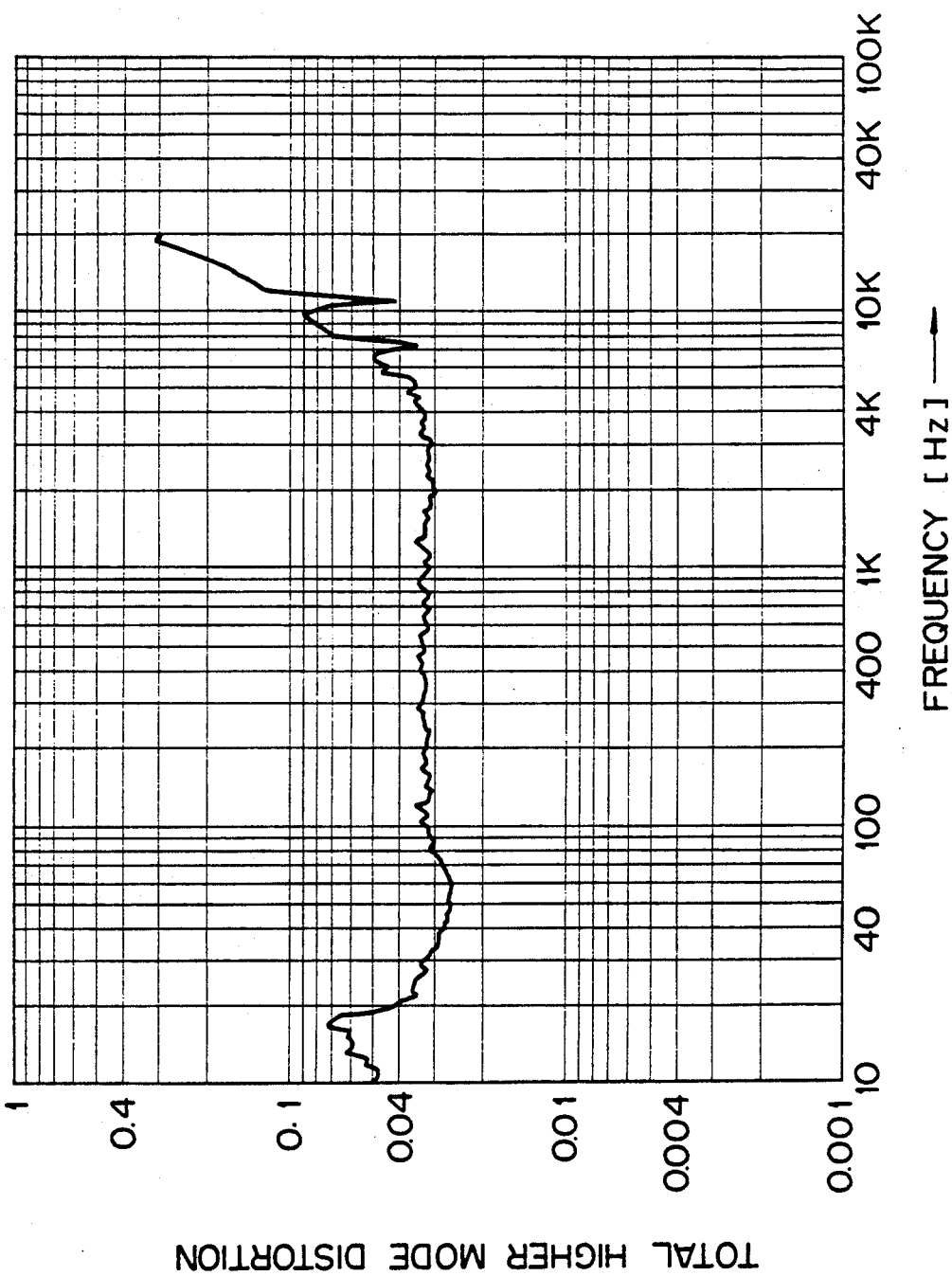
FIG. 9 is a view showing total harmonic distortion in a low frequency range according to the embodiments.

FIG. 9 is a view showing total harmonic distortion in a low frequency range according to the embodiments. As shown in FIG. 9, it will be understood that the total harmonic distortion of the digital filter, which is set to the same conditions in a low frequency range, is improved remarkably compared with that of the prior art in FIG. 4. Thus according to the present invention it is possible to improve the computing accuracy without increasing the hardware scale.

The present invention offers a computing method of floating-point represented data with small scale hardware and high computing accuracy in a low frequency range by dividing data into high rank data and low rank data so as to compute other data together with the high rank data and the low rank data.

I claim:

1. A computing method of a floating-point represented bit data X having an exponential part and a mantissa part, the mantissa part including first and second mantissa parts, comprising the steps of:

(a) storing the floating-point represented bit data X in an n bit length register;

(b) storing a floating-point represented high rank bit data X' having first and second high rank data parts, with the exponential part and the first mantissa part of the floating-point represented bit data X in the n bit length register in the first high rank data part and with zeros in the second high rank data part, in a first m bit length register wherein n is greater than m;

(c) storing a floating-point represented low rank bit data $\alpha$ obtained by subtracting said floating-point represented high rank bit data X' from said floating-point represented bit data X in the n bit length register, in a second m bit length register;

(d) computing other floating-point bit data stored in a third m bit length register, using said floating-point represented high rank bit data X' and said floating-point represented low rank bit data $\alpha$ registered in the first and second m bit length registers to obtain accurate floating-point data; and (e) storing said accurate floating-point data in a fourth m bit length register.

2. A computing method of floating-point represented bit data X according to claim 1, wherein the floating-point represented bit data X comprises a computing factor $a_n$ of a digital filter previously divided into two computing factors $a_{in}$ and $a_{2n}$ each having the mutual m bit length such that $a_n = a_{in} + a_{2n}$, $1_{in} < a_{2n}$ and computing other bit data using said two computing factors.

3. A computing method of floating-point represented bit data X according to claim 1, wherein the floating-point represented bit data X comprises computed bit data divided into two computing factors $r_{in}$ and $r_{2n}$ each having the mutual m bit length such that $r_n = r_{in} + r_{2n}$, $r_{in} < r_{2n}$ and computing other bit data using said two computing factors.

4. A computing method of floating-point represented bit data X according to claim 1, wherein the floating-point represented bit data X comprises a computing factor $a_n$ of a digital filter previously divided into first computing factors $a_{in}$ and $a_{2n}$ each having the mutual m bit length such that $a_n = a_{in} + a_{2n}$, $a_{in} < a_{2n}$, and computed data divided into second computing factors $r_{in}$ and $r_{2n}$ each having the mutual m bit length such that $r_n = r_{in} + r_{2n}$, $r_{in} < r_{2n}$ and computing other bit data using said first and second computing factors.

* * * * *

UNITED STATES PATENT AND TRADEMARK OFFICE
CERTIFICATE OF CORRECTION

PATENT NO. : 5,182,723
DATED : Jan. 26, 1993
INVENTOR(S) : KAMIMURA

It is certified that error appears in the above-indentified patent and that said Letters Patent is hereby corrected as shown below:

Col. 1, line 67, after "in" delete ",".

Col. 2, line 15, delete "the".

Col. 5, line 8, after "$r_n$" insert -- = --.

Signed and Sealed this

Nineteenth Day of July, 1994

Attest:

BRUCE LEHMAN

*Attesting Officer*    *Commissioner of Patents and Trademarks*